United States Patent [19]

Wills

[11] Patent Number: 5,049,064
[45] Date of Patent: * Sep. 17, 1991

[54] BURNER WITH REGENERATIVE BED

[76] Inventor: Brian Wills, "Sandbourne", Stoney Lane, Kinver, West Midlands, United Kingdom

[*] Notice: The portion of the term of this patent subsequent to Jun. 13, 2006 has been disclaimed.

[21] Appl. No.: 511,876

[22] Filed: Apr. 19, 1990

Related U.S. Application Data

[63] Continuation of Ser. No. 328,055, Mar. 23, 1989, abandoned, which is a continuation-in-part of Ser. No. 82,850, Aug. 6, 1987, Pat. No. 4,838,782.

[51] Int. Cl.$^5$ .............................................. F23D 11/44
[52] U.S. Cl. ...................................... 431/215; 431/7; 431/11; 431/207; 431/166; 431/167; 432/181; 432/182
[58] Field of Search ...................... 431/7, 11, 176, 166, 431/167, 207, 215, 217, 240; 165/9.3; 432/180, 181, 182, 54; 126/91 A

[56] References Cited

U.S. PATENT DOCUMENTS

| | | | |
|---|---|---|---|
| 2,399,609 | 4/1946 | Wainer | 432/32 X |
| 2,480,255 | 8/1949 | Mortson et al. | 431/167 X |
| 3,468,616 | 9/1969 | Ward | 431/166 |
| 4,355,973 | 10/1982 | Bailey | 432/209 |
| 4,392,818 | 7/1983 | Wunning | 431/215 |
| 4,408,983 | 10/1983 | Masters et al. | 431/215 X |
| 4,604,051 | 8/1986 | Davies et al. | 431/166 |
| 4,657,504 | 4/1987 | Akiyama et al. | 431/166 |
| 4,838,782 | 6/1989 | Wills | 431/7 |

FOREIGN PATENT DOCUMENTS 2128724 5/1984 United Kingdom .

Primary Examiner—Carl D. Price
Attorney, Agent, or Firm—Fulwider, Patton, Lee & Utecht

[57] ABSTRACT

A regenerative burner includes a chamber containing heat storage bodies which extract heat from hot products of combustion flowing through the burner during one part of a cycle of operation and yield up that heat to incoming air during a further part of the cycle.

8 Claims, 4 Drawing Sheets

BURNER WITH REGENERATIVE BED

This application is a continuation, of application Ser. No. 328,055, filed Mar. 23, 1989, now abandoned, which is a continuation-in-part of application Ser. No. 082,850 filed Aug. 6th 1987 now U.S. Pat. No. 4,838,782.

The present invention relates to a burner operable in fire and flue modes and which is provided with means for storing heat which is extracted from products of combustion when the burner is operating in the flue mode and which is then imparted to combustion air, when the burner is operating in the fire mode. Burners which are operable in fire and flue modes are usually used in pairs, the burners firing alternately into a common combustion space or furnace chamber.

The present invention is particularly concerned with incorporation of the heat storing means within the burner.

It has been proposed in U.S. Pat. Nos. 3,468,616 issued to T. Ward on Sept. 23rd 1969 and in 4,657,504 issued to T. Akiyama et al. on Apr. 14th 1987 to incorporate in a burner a heat exchanger for transferring heat continuously from products of combustion to combustion air. The heat exchangers proposed in these references are arranged for counter current flow of the hot products of combustion and combustion air along adjacent paths within the burner. These burners operate continuously in a fire mode and heat exchange takes place continuously.

The use of heat storing means which is disposed outside, but connected with, a burner is well known and is proposed in, for example, U.S. Pat. No. 2,480,255 issued to Mortson et al.

A structure in which heat storing means is closely associated with fuel-supply means is proposed in U.S. Pat. No. 4,671,345 issued to Masters et al. on June 9th 1987. Masters et al. propose association with a single fuel-supply duct of a pair of regenerators. Combustion air is supplied through the regenerators alternately and hot products of combustion are exhausted through the regenerator which is not being used to heat combustion air. The regenerators and the fuel-supply means collectively occupy a cylindrical shaft. The cylindrical wall which defines this shaft extends along the entire lengths of the regenerators and from the regenerators beyond the position where the fuel and air mix for combustion. A free-end portion of the fuel pipe is shaped to restrict the flow of air from each regenerator in a manner such as to establish a low pressure in the combustion air and so promote flow of the fuel into the stream of combustion air. The shaping of the fuel pipe also establishes a higher pressure in the products of combustion flowing towards the other regenerator so that flow of fuel into the products of combustion is inhibited. This facilitates the use of a single fuel-supply pipe with a pair of regenerators so that the burner can be used as a single burner which operates continuously, rather than operating alternately in flue and fire modes.

A pair of burners which are operated alternately in flue and fire modes and which incorporate heat storing means is proposed in U.S. Pat. No. 4,355,973 issued to J. M. Bailey on Oct. 26th 1982. The burners proposed by Bailey are mounted in opposite end portions of a heating tube which is a source of radiant heat. The heat storing means comprises a row of annular blocks through which passages extend. The outside diameter of each block is substantially equal to the internal diameter of the heating tube and a fuel-supply pipe extends through the central openings of the blocks. The cylindrical wall of the heating tube which surrounds the heat storing means necessarily extends without change in diameter past the heat storing means and past the position where the fuel mixes with the combustion air. The cross-sectional area of the space available to contain the heat storing means is necessarily less than the cross-sectional area of that part of the heating tube where combustion occurs, since the fuel supply pipe occupies a space at the centre of each block of the heat storing means.

In U.S. Pat. No. 4,604,051 issued to T.E. Davies et al. on Aug. 5th 1986, there is proposed a further burner incorporating heat storing means. The burner proposed by Davies et al. has a housing connected to one end of a radiant heating tube and a tubular structure extending along the interior of the housing into the heating tube. Within the tubular structure, there is defined a fuel-flow path. When the burner is operating in the fire mode, fuel flows along this path and mixes with combustion air at a position adjacent to a free-end of the tubular structure and within the heating tube. The housing defines at the outside of the tubular structure a chamber which is tapered, having a larger diameter immediately adjacent to the end of the radiant heating tube and a smaller diameter remote from the heating tube. This chamber is divided into three, concentric, annular spaces. The outermost space serves as an air-inlet chamber. The radially innermost space serves as an air outlet chamber and communicates directly with the interior of the radiant heating tube. The intermediate space is occupied by a frusto-conical bed constituting the heat storing means. When the burner is operating in the fire mode, combustion air is admitted to the air inlet chamber and flows in a radially inwards direction through the bed to the air outlet chamber and then flows in an axial direction from the air outlet chamber along the radiant heating tube. When the burner is operating in the flue mode, hot products of combustion flow from the air outlet chamber in a radially outward direction through the bed to the air inlet chamber and thence to a flue.

The arrangement proposed in the Davies et al. patent provides a large area for the flowpath through the bed. The transverse area of the flowpath is approximately equal to the area of the radially inwardly facing boundary of the bed and is dependent upon the length of the bed. It is an object of the present invention to provide a burner which is less expensive to manufacture, is more robust and reliable in operation than is the burner proposed in the Davies et al. patent.

Davies et al. teaches the provision of a bed which is composed of fairly small particles. Small particles have a high surface area relative to volume and therefore provide good heat exchange with the flue gases and with the combustion air. However, a bed composed of small particles provides a relatively high resistance to the flow of gases through the bed, as compared with a heat store defining relatively large passages for the flow of gases. In order to avoid an excessively large pressure drop through the bed, the bed proposed by Davies et al. is thin, as measured in the radial direction, so that the path followed by gases through the bed is short. In consequence of this, the cycle time must be short and a cycle time of 15 seconds is taught in the Davies et al. patent.

At the end of each half cycle, there must be a delay between the interruption of the supply of fuel to one burner and the resumption of the supply of fuel to the other burner. Typically, the duration of this delay must be several seconds. With a cycle time of 15 seconds, this represents a substantial proportion of each cycle so that the heat output from the burners is substantially less than would be the case if one or other of the burners was firing throughout the entire cycle.

In the burner disclosed in the Davies et al. specification, the wall at the inner periphery of the bed is a permeable wall, must be capable of retaining small particles of bed material and must cause only a very small pressure drop in the gases flowing through the wall. Since the combustion gases flow through the wall, the wall will inevitably be subjected to high temperatures so that metallic materials will generally be unsuitable for construction of the wall. A ceramic material which is capable of retaining small particles of bed material and yet provides only a low pressure drop must be very thin and therefore fragile.

SUMMARY OF THE INVENTION

According to a first aspect of the invention, there is provided a burner operable in fire and flue modes and comprising a housing defining an opening which is an air inlet opening when the burner is operating in the fire mode, an inner tubular structure extending along the interior of the housing to define therewith an annular regenerator chamber between the interior of the housing and the exterior of said inner tubular structure and gas-permeable heat storing means occupying said regenerator chamber and having a first end adjacent to said opening and a second end remote from said opening, wherein said tubular structure has a free-end spaced along the housing from said first end of the heat storing means, said tubular structure defines a fuel flow duct within the tubular structure leading to a mixing position adjacent to the free-end of said tubular structure, said opening communicates with said regenerator chamber and said regenerator chamber provides a path for the flow of air from said opening through the heat storing means in a direction from said first end thereof to said second end thereof and to the mixing position, when the burner is operating in the fire mode, and for the flow of products of combustion from the mixing position through the heat storing means in a direction from said second end thereof to said first end thereof and to said opening, when the burner is operating in the flue mode, wherein there is adjacent to said second end of the heat storing means a frusto-conical peripheral wall of the regenerator chamber and wherein said peripheral wall has a larger diameter nearer to said first end of the heat storing means and a smaller diameter further from the first end of said heat storing means.

Flow of products of combustion along the heat storing means in a direction from the second end thereof to the first end thereof enables the path of the gases within the heat storing means to be long, as compared with the path of the gases through the bed disclosed in the Davies et al. patent. This enables a much longer cycle time to be used and assists with distribution of the gas flow evenly throughout the heat storing means.

The outer wall of the inner tubular structure can be robust. The wall may be metallic, in a case where the wall will be subjected to temperatures not significantly above 1000° C. Alternatively, in cases where the wall is to be subjected to much higher temperatures, the wall can be formed of ceramic materials and can have whatever thickness is necessary to provide the desired strength.

According to a second aspect of the invention, there is provided a burner operable in fire and flue modes and comprising a housing defining a regenerator chamber and an air inlet opening to said chamber, gas permeable heat storing means disposed in said chamber, a fuel supply duct extending into the housing for supplying a fluent fuel to a mixing position remote from said air inlet opening, the heat storing means being interposed in an air flow path between said air inlet and said mixing position for heating combustion air when combustion air flows to the mixing position from the air inlet, and means defining an outlet for discharging a burning mixture of fuel and air from the mixing position, wherein the housing includes a frusto-conical wall portion which faces towards the heat storing means, lies near to but is spaced radially outwardly from the mixing position, has a larger diameter portion nearer to said air inlet opening and has a smaller diameter portion further from the air inlet opening.

BRIEF DESCRIPTION OF THE DRAWINGS

Examples of furnaces which include burners embodying the invention will now be described, with reference to the accompanying drawings, wherein.

DETAILED DESCRIPTION

Figure 1:
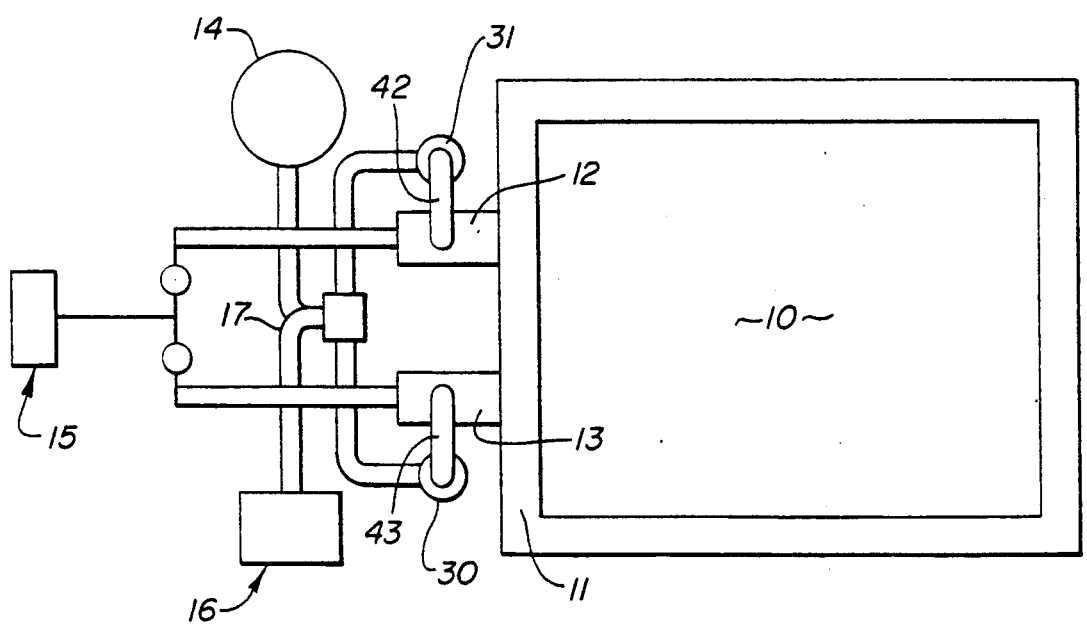
FIG. 1 shows a diagrammatic representation of a first furnace, burners and associated equipment.
Figure 2:
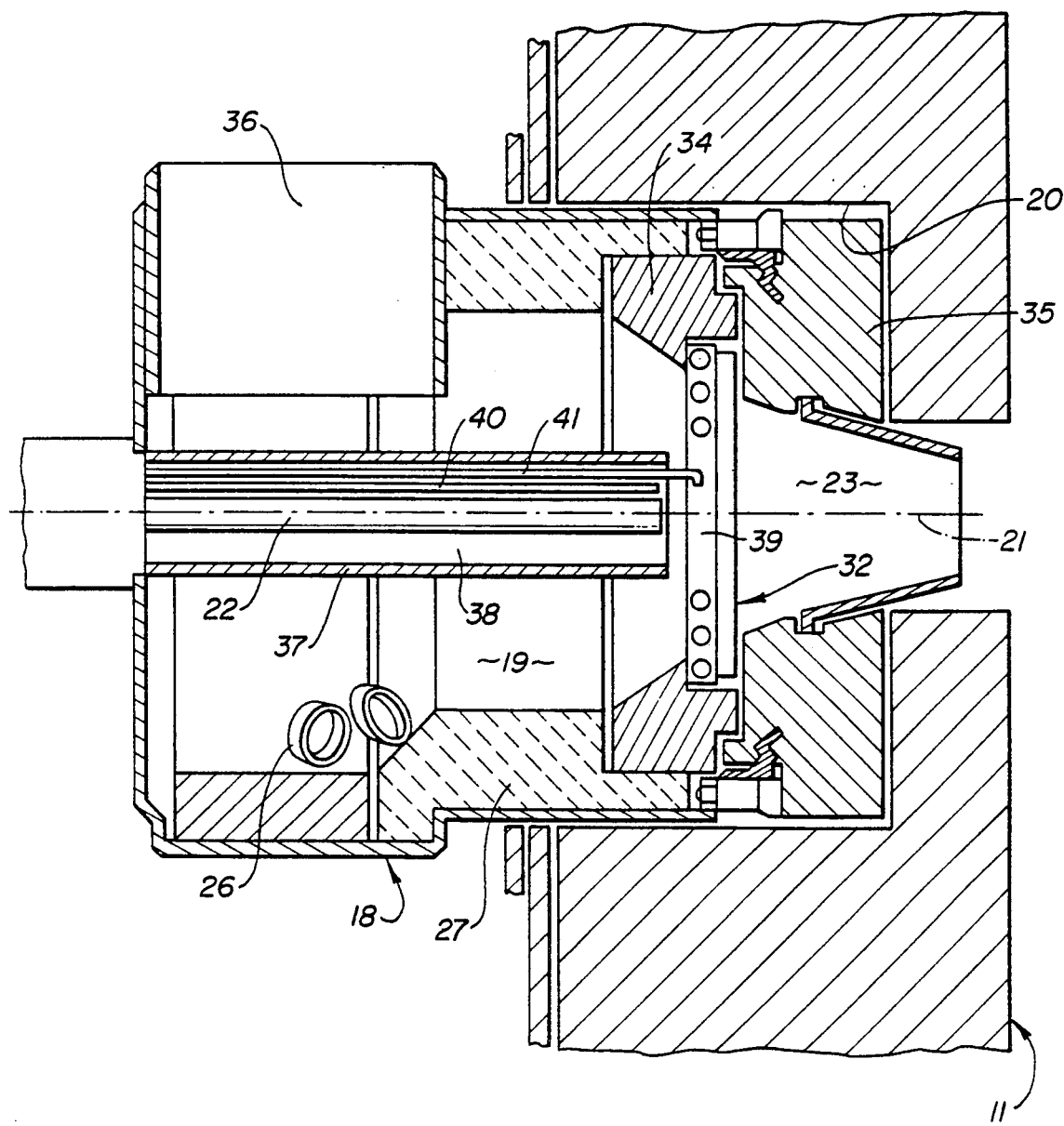
FIG. 2 shows diagrammatically a cross-section through one of the burners of the first furnace and an adjacent part of that furnace.

The furnace illustrated in FIGS. 1 and 2 includes walls defining a chamber 10 in which workpieces or materials are to be heated. The furnace includes an entrance and means may be provided for introducing workpieces or materials into the chamber 10 and transferring workpieces out of the chamber 10. However, as these details form no part of the present invention, they are not represented in the drawing. One of the walls 11, defines two openings and there are mounted on the wall 11, partly lying outside the furnace, respective burners 12 and 13 which communicate with the chamber 10 through these openings. The burners are operated alternately in a cyclical manner. During a first half of each cycle, fuel and air are supplied separately to the burner 12, are mixed by the burner and burn as they are discharged from the burner through the opening in the wall 11 into the chamber 10. Hot products of combustion pass from the chamber 10 through the burner 13 and associated heat storage means 30 to a flue 14. Heat is extracted from the products of combustion and stored in the burner 13 and the heat storage means 30 so that the products of combustion discharged to the flue are cool, relative to the products of combustion in the chamber 10 during steady-state operation. Typically, the temperature of the gases in the chamber 10 may be within the range 800° to 1400° C.; whereas the temperature of the gases leaving the burner 13 may be in the range 500° to 700° and the temperature of the gases leaving the heat means 30 may be in the range 100° to 200° C. During the second half of the cycle, air and fuel are supplied separately to the burner 13. The air is heated in the heat storage means and in the burner from ambient temperature to a temperature which is typically within the range 700° to 1200° C., before being mixed in the burner 13 with the fuel. The fuel and hot air burn as they pass from the burner into the chamber 10 and the hot products of combustion are withdrawn from the chamber through the burner 12. During the second half of the cycle, the burner 12 and heat storage means 31 associated therewith extract heat from the products of combustion, before these are discharged to the flue 14.

For supplying fuel to the burners alternately, there is provided fuel supply means indicated by the reference number 15. The fuel is typically natural gas and the supply means 15 may include a gas main and valves for controlling the flow of gas from the main to each of the burners.

For supplying air alternately to the burners, there is provided air supply means identified by the reference numeral 16. The air supply means includes a fan and one or more valves associated with the burners 12 and 13 for directing air from the fan to one of the burners and directing products of combustion from the other of the burners to the flue 14. A further fan (not shown) may be provided upstream of the flue 14.

The structure of the burner 12 is illustrated in more detail in FIG. 2. The burner includes a housing 18 which is disposed partly within and partly outside the furnace wall 11 and which is attached to that wall. Within the housing 18, there is defined an annular chamber 19 which is in co-axial relation with a circular opening 20 defined by the wall 11. The axis of the chamber 19 is represented at 21 in FIG. 2 and is typically perpendicular to the external surface of the wall 11.

At the center of the annular chamber 19, there is a fuel pipe defining a fuel-flow path from the fuel supply means 15 to a mixing position 23 which lies outside the pipe 22, beyond the free-end thereof.

Figure 3:
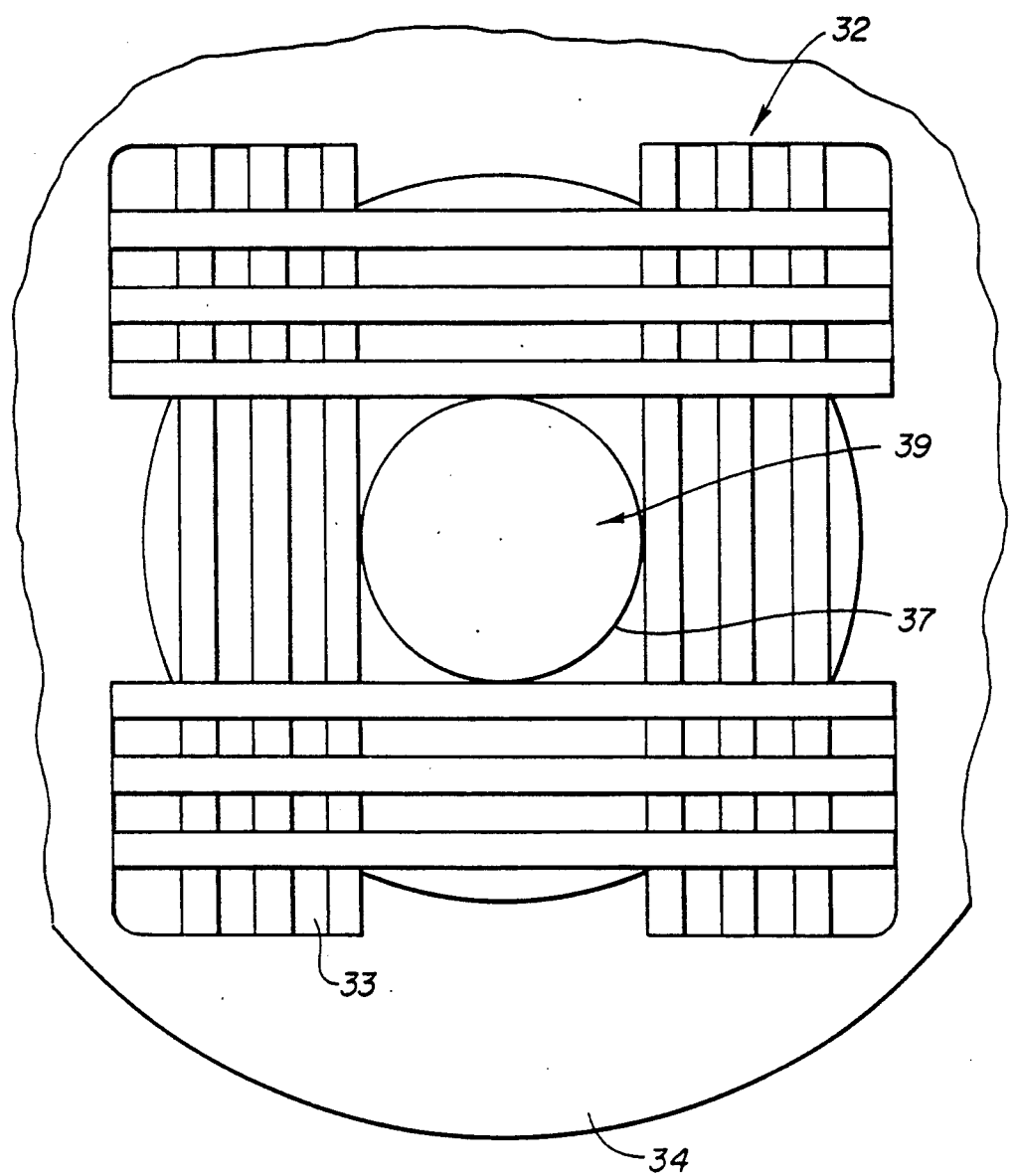
FIG. 3 shows certain details of the burner of FIG. 2.

At the end of the chamber 19 which is adjacent to the free-end of the pipe 22, the chamber is separated from the mixing position 23 by an array 32 of bars which collectively form a permeable wall defining one end of the chamber. The array comprises two layers or bars, the bars of a first of the layers being parallel to one another and perpendicular to the bars of the second layer. All of the bars are perpendicular to the axis 21. As shown in FIG. 3, there are defined between the bars gaps 33 through which gases can flow without significant resistance. Opposite end portions of each bar are seated in an annular recess defined by an annular block 34 at the periphery of the chamber 19. Spacers are interposed between the corresponding end portions of mutually adjacent bars to maintain the gaps 33 and the assembly of bars and spacers held in the recess of the block 34 by a gasket and a further block 35. The bars of the array 32 may be solid rods or hollow tubes and are preferably formed of a ceramic material. It will be understood that other forms of permeable wall structure, for example, a ceramic block defining interstices through which gases can flow, may be substituted for the array 32.

The chamber 19 contains a permeable heat storage bed comprising a number of heat storage bodies 26 which are initially separate from one another but are packed into the chamber 19 to occupy that chamber substantially entirely, except for interstices between the bodies. Heat storage bodies 26 of the bed rest against the array 32 and against a wall of the housing 18 which defines an opposite end of the bed.

Preferably, the heat storage bodies 26 provided in the chamber 19 adjacent to the array 32 are larger than the heat storage bodies disposed further along the chamber. The heat storage bed may comprise heat storage bodies of two or more different sizes, those of the larger size being generally near to the array 32 and those of the smaller size being spaced from the array. Alternatively, there may be heat storage bodies of a large number of different sizes, the average size in a region adjacent to the array 32 being larger than the average size in a region spaced from the array.

The array 32 defines one end of the bed which is composed of the bodies 26. Since the bodies, at least adjacent to the array 32, are quite large, the interstices defined by the array can also be quite large. Accordingly, the array does not cause a significant pressure drop in gases flowing through the array. Furthermore, the array is robust and is not prone to blockage by accummulation of foreign matter within the interstices defined by the array.

Each of the heat storage bodies 26 has at least one dimension exceeding five millimeters. Preferably, the interstices defined by the array 32 are at least five millimeters across and the heat storage bodies are so large that they cannot pass through the interstices defined by the array. Mutually adjacent interstices defined by the array are separated by structural parts of the array and these parts have widths, measured in a direction between the two adjacent interstices, similar to the widths of the interstices measured in the same direction.

The thickness of the array 32 between a face of the array presented to the bed of heat storage bodies 26 and an opposite face of the array is in excess of ten millimeters, exceeds the largest dimension of the bodies 26, exceeds the largest dimension of each interstice defined by the array and exceeds the internal diameter of the fuel pipe 22 adjacent to the free-end thereof. The diameter of the chamber 19 where the radially inwardly facing surface of the annular block 34 meets the array 32 may be no more than twenty five times the thickness of the array and may be as small as twice the thickness of the array.

The radially inwardly facing surface of the annular block 34 is of conical form, the smaller diameter being immediately adjacent to the array 32 and the larger diameter being spaced away from the array in a direction towards a rear end of the chamber 19 remote from the mixing position 23. The annulus 34 serves partly to support the weight of the heat storage bodies 26 and partly to prevent movement of the heat storage bodies from the chamber 19 in a direction towards the mixing position 23.

The peripheral boundary of the chamber 19 is defined by a refractory lining 27 inside the housing 18. A layer of this lining which is nearer to the axis 21 is preferably formed of a fibrous material. To reduce the risk of the fibrous material being compressed excessively by the load imposed by the refractory bodies 26, there is provided a hollow support 37 which defines the radially innermost boundary of the chamber 19 and is therefore surrounded by the mass of refractory bodies. The support 37 may be cylindrical and is preferably co-axial with the fuel pipe 22. The internal diameter of the support 37 is substantially greater, preferably a plurality of times greater, than the external diameter of the fuel pipe 22 so that there is between the fuel pipe and the support an annular space 38. The support 37 is impermeable to gases and, at least when the burner is operating in the fire mode, a flow of air may be directed along the annular space 38 towards the mixing position 23 to extract heat from the fuel pipe 22 and/or to reduce the flow of heat to that fuel pipe through the support 37.

The support 37 approaches sufficiently closely to the array 32 to prevent refractory bodies 26 escaping from the chamber 19 in a direction towards the mixing position 23. It will be noted that there is at the centre of the array 32 an unobstructed space 39 having a width approximately equal to the outside diameter of the support 37. The fuel pipe 22, or a nozzle provided thereon, may extend through the space 39 to the mixing position, into, but not completely through this space, or may terminate at the side of the array 32 remote from the mixing position. It will be noted that the array 32 is separate from the support 37 and from the fuel pipe 22. The support 37 is preferably spaced from the array 32 in a direction along the axis 21. However, it would be within the scope of the invention for an end portion of the support 37 to extend into the space 39.

A pilot burner and associated fuel-supply line 40 extends along the annular space 38 and terminates at a position outside the fuel pipe 22 but just inside the tube 37. Adjacent to the pilot burner, there is provided a flame-detection device 41 and connection means connecting the flame-detection device with control means of the burners also extends along the annular space 38. Additional sensing and control devices can be accommodated in the space 38, at the inside of the hollow support 37.

The array 32 also serves as a flame stabilizer, in addition to the function of excluding the heat storage bodies 26 from the mixing position 23. When the burner is operating in the fire mode, combustion air flows through the chamber 19 towards the mixing position and leaves the bed of refractory bodies, partly through the annular gap between the support 37 and the array 32 and partly through the interstices between parts of the array 32. These parts of the array promote turbulence in the airflow so that the flame is stabilized at the downstream side of the array 32. It will be noted that no flame stabilizer is provided in or on the fuel pipe 22. The flame stabilizing array 32 is spaced from the fuel pipe.

Flow of combustion air from the bed of heat storage bodies 26 through the annular gap between the support 37 and the array 32 promotes turbulence of the gas flow emerging from the fuel pipe 22 and mixing of that gas flow with the combustion air. If required, a helical or other vane may be fitted at the free-end of the fuel pipe 22 to further promote turbulence of the gas flow emerging from the fuel pipe. A nozzle may be provided as an alternative to a vane, for the same purpose.

The heat storage means 31 may be constructed and arranged in a known manner and comprises a further mass of refractory bodies in a thermally insulated container. The container is spaced somewhat from the burner 12 and is connected with the inlet 36 of the burner by a thermally insulated duct 42.

The structure of the burner 13 may be identical with that of the burner illustrated in FIGS. 2 and 3. The heat storage means 30 is connected with the burner 13 by a thermally insulated duct 43 and the heat storage means 30 may be identical with the heat storage means 31.

When hot products of combustion are flowing from the furnace chamber 10 through the burner 12 to the flue 14, the fuel flowpath through that burner is closed by the fuel supply means 15 and the products of combustion which enter the burner from the opening 20 pass through the array 32 into the chamber 19. The direction of flow into and through the bed of heat storage bodies is generally along the axis 21, rather than transverse to the axis. In the chamber 19, heat is transferred from the products of combustion to the heat storage mass so that the products of combustion are considerably cooler, when they flow from the chamber 19 into the duct 42, than when they flow into the chamber 19.

It will be noted that the fuel pipe 22 is shielded by the hollow support 37 from direct contact with the hot products of combustion flowing through the chamber 19 when products of combustion are discharged from the chamber 10 through the burner 12.

As shown in FIG. 2, the air inlet 36 is of tubular form and is arranged with its axis perpendicular to the axis 21. The air inlet protrudes somewhat into the chamber 19, but is spaced from the support 37. This arrangement of inlet contributes to the construction of a compact burner. Surprisingly, although the flow of combustion air through the inlet 36 enters the chamber 19 at one side only of the axis 21, we have found that there is a good distribution of airflow throughout the bed of refractory bodies 26. Similarly, when products of combustion flow through the chamber 19 and leave the burner through the air inlet 36, the flow is well distributed throughout the bed of refractory bodies.

Alternatively, the air inlet 36 may extend through the circumferential wall of the chamber 19 and through the lining but merge smoothly with the surface of the lining which is nearest to the axis 21 so that the air inlet does not lie significantly nearer to that axis than is the lining. The end portion of the air inlet nearer to the axis may be outwardly flared, to promote distribution of the flow throughout the chamber. The air inlet, as viewed in a direction towards the axis 21 may be circular, square or otherwise rectangular. A layer of expanded metal may be present around the circumference of the bed of heat storage bodies 26. Such a layer distributes over the lining pressure exerted by the bodies 26 and prevents those bodies leaving the chamber through the air inlet, during transport of the burner to the place of use.

The products of combustion flow from the burner 12 through the duct 42 to the heat storage means 31, where the products of combustion are further cooled and the heat extracted from the products of combustion is stored in the heat storage bodies. Of the total heat stored in the heat storage bodies in the burner 12 and in the heat storage means 31 the proportion which is stored in the burner is preferably at least one tenth and more preferably exceeds one fifth and is typically one half.

When air and fuel are being supplied through the burner 12, fuel flows from the fuel supply means 15 along the fuel pipe 22 and is discharged from that pipe at the mixing position 23, which is disposed within the housing 18. Air at approximately ambient temperature is supplied through the heat storage means 31 to the chamber 19 of the burner, being heated in the heat storage means and further heated in the chamber 19 so that the temperature of the air discharged from the chamber 19 through the array 32 to the mixing position 23 is fairly high, initially being within about 200° C. of the temperature at which products of combustion leave the chamber 10. It will be understood that the temperature of the air discharged at the mixing position falls as the cycle proceeds and heat is extracted from the heat storage bodies.

If foreign matter accumulates on the heat storage bodies 26 in the burner, it will be necessary to clean or replace these heat storage bodies. For this purpose, the burner may be constructed to permit removal of the heat storage bodies from the burner whilst the burner remains mounted on the furnace wall 11. Alternatively, the burner may be demounted and the bodies removed from the chamber 10 at the end thereof which is adjacent to the mixing position. It will be noted that foreign matter will accummulate on the heat storage bodies in the burner, rather than on heat storage bodies in the heat storage means 31 and that cleaning or replacement of all of the heat storage bodies provided will not generally be necessary.

The apparatus illustrated in the accompanying drawing may be modified by omission of the heat storage means 30, the duct 43, the heat storage means 31 and the duct 42. In this case, the heat storage means is contained entirely within the burners and only parts of the furnace and parts of the burners are exposed to high temperatures. In this modified version of the apparatus, there are no ducts, valves or joints outside the burners which are subjected to temperatures similar to those attained in the furnace chamber 10.

The period occupied by a complete cycle of operation, that is operation of each burner in the fire mode and in the flue mode, is preferably at least 30 seconds. More preferably, the period during which fuel is supplied continuously to one of the burners when that burner is operating in the fire mode is at least 30 seconds so that a complete cycle will occupy a period in excess of one minute.

Figure 4:
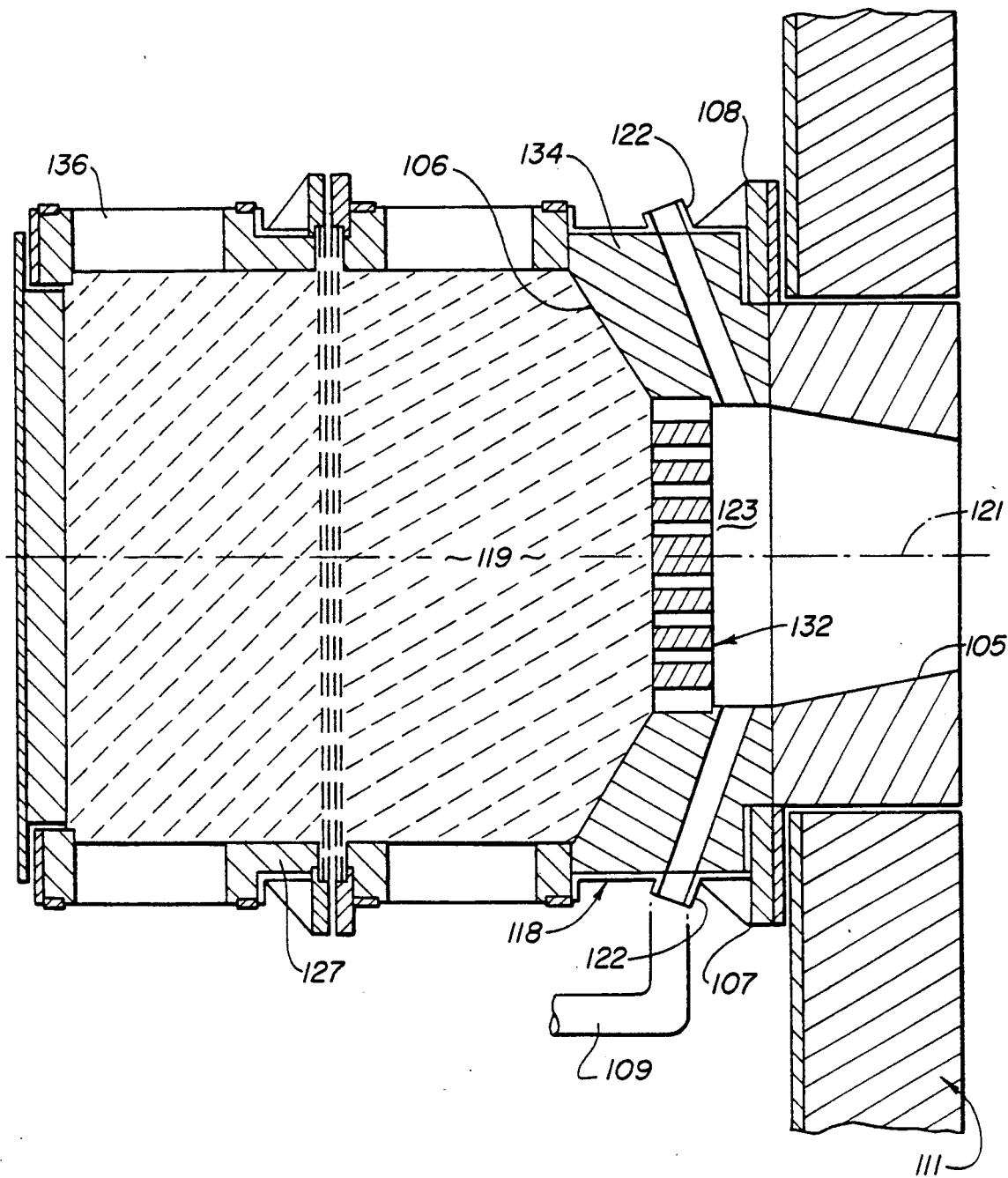
FIG. 4 shows diagrammatically, by a view corresponding to FIG. 2, a part of a second furnace and a burner associated therewith.

In FIG. 4, there is illustrated a modification of the furnace and burners shown in FIGS. 1 and 2. In FIG. 4, there is illustrated a part only of the furnace wall and one burner. The general arrangement of the furnace of FIG. 4 is the same as that of the furnace of FIG. 1 and the furnace of FIG. 4 incorporates a second burner in the manner hereinbefore described. Parts illustrated in FIG. 4 which correspond to parts hereinbefore described with reference to FIGS. 1, 2 and 3 are identified in FIG. 4 by like reference numerals with the prefix 1. The preceding description is deemed to apply to such corresponding parts, except for the differences hereinafter mentioned.

The burner shown in FIG. 4 lies substantially entirely outside the wall 111 of the furnace chamber and communicates with that chamber through an opening in the wall. The housing 118 of the burner is mounted on the wall 111 by means of brackets 107, 108 or in any other convenient manner.

A fuel pipe 122 extends into the housing 118 from the circumference thereof at a position between opposite ends of the burner. The fuel pipe leads to the mixing position 123 and has an open end at the periphery of the mixing position and immediately adjacent to the flame stabiliser array 132, at the side thereof nearer to the furnace chamber. As shown, there may be a plurality of fuel pipes arranged in a corresponding manner and disstributed around the axis 121. The fuel pipes preferably communicate with a common manifold 109 situated outside the housing 118.

The chamber 119 contains heat storing means which may be of known form. For example, the heat storing means may comprise a cast block of porous refractory material. The block may be generally cylindrical in shape. Alternatively, the heat storing means may comprise a number of heat storing elements packed into the chamber 119, as hereinbefore described.

Adjacent to that end of the heat storing means which is nearer to the array 132, there is provided in the housing 118 an annular block 134 which presents towards the heat storing means a frusto-conical face 106. The larger diameter of this face is nearer to the air inlet 136 and the smaller diameter of the face 106 is further from the air inlet opening. In a case where the heat storing means comprises a bed of discrete elements, some of these elements would rest against the surface 106 and be supported thereby.

At the side of the mixing position 123 which is remote from the heat storing means in the chamber 119, there is provided a tapered surface 105 which defines an outlet from the burner for a burning mixture of fuel and air. The surface 105 extends into the opening in the furnace wall 111.

When the burner is operating in the flue mode, products of combustion enter the burner through the opening defined by the surface 105 and pass through the array 132 into the heat storing means in the chamber 119. The products of combustion are cooled in this chamber and then leave the burner through the opening 136. When the burner is operating in the fire mode, combustion air enters the burner at the opening 136 and flows through the heat storing means and through the array 132 to the mixing position. Gaseous fuel is directed towards the mixing position through the fuel pipes 122. The elements of the array 132 promote turbulence in the gases at the mixing position.

Means for maintaining a pilot flame and means for detecting and monitoring the flame (not shown) may extend to the mixing position 123 through ports formed in the annular block 134, these ports being similar to the ports containing the fuel pipes.

As shown in FIG. 4, the housing 118 can conveniently be formed in two or more separable parts. Each such part contains a respective heat storage mass and each such part of the housing may have a plurality of openings which are similar to the air inlet opening 136. In operation, all except the one opening 136 would be sealed with detachable covers (not shown). The presence of the openings additional to the opening 136 facilitates filling of the chamber 119 with the heat storage mass and emptying of that mass from the chamber. Respective parts of the housing may contain heat storage elements having dimensions different from those occupying another housing part. The heat storage elements occupying that part of the chamber 119 which is adjacent to the flame stabiliser array 132 preferably have dimensions larger than those occupying other parts of the housing. A perforated alloy plate may divide the chamber 119 at the junction of the housing parts.

What we claim is:

1. A burner operable in fire and flue modes and comprising a housing defining an opening which is an air inlet opening when the burner is operating in the fire mode, an inner tubular structure extending within the interior of the housing to define therewith an annular regenerator chamber between the interior of the housing and the exterior of said inner tubular structure and gas permeable heat storing means occupying said regenerator chamber said heat storing means having a first end adjacent to said opening and a second end remote from said opening, wherein said tubular structure comprises an outer wall with a free end spaced within the housing remote from said first end of the heat storing means, said tubular structure further comprises a fuel flow duct spaced inwardly from the outer wall and leading to a mixing position adjacent to the free end of said outer wall, wherein there is between the fuel flow duct and the outer wall of the tubular structure an annular space, the burner further comprises means for supplying air to the mixing position through said annular space, said opening communicates with said regenerator chamber and said regenerator chamber provides a path for the flow of air from said opening through the heat storing means in a direction from said first end thereof to said second end thereof and to the mixing position when the burner is operating in the fire mode and for the flow of products of combustion from the mixing position through the heat storing means in a direction from said second end thereof to said first end thereof and to said opening when the burner is operating in the flue mode, wherein there is adjacent to said second end of the heat storing means a frusto-conical peripheral wall of the regenerator chamber and wherein said peripheral wall has a larger diameter nearer to the first end of the heat storing means and a smaller diameter further from the first end of the heat storing means, said peripheral wall defining a further opening providing communication between the mixing position and the regenerator chamber.

2. A burner operable in fire and flue modes and comprising a housing defining a first opening which is an air inlet opening when the burner is operating in the fire mode, an inner tubular structure extending within the interior of the housing to define therewith an annular regenerator chamber between the interior of the housing and the exterior of said inner tubular structure and gas permeable heat storing means occupying said regenerator chamber, said heat storing means having a first end adjacent to said first opening and a second end remote from said first opening, wherein said tubular structure has a free end spaced within the housing remote from said first end of the heat storing means, said tubular structure defines a fuel flow duct within the tubular structure leading to a mixing position adjacent to the free end of said tubular structure, said first opening communicates with said regenerator chamber and said regenerator chamber provides a path for the flow of air from said opening through the heat storing means in a direction from said first end thereof to said second end thereof and to the mixing position when the burner is operating in the fire mode and for the flow of products of combustion from the mixing position through the heat storing means in a direction from said second end thereof to said first end thereof and to said first opening when the burner is operating in the flue mode, wherein there is adjacent to said second end of the heat storing means a frusto-conical peripheral wall of the regenerator chamber, wherein said peripheral wall has a larger diameter nearer to the first end of the heat storing means and a smaller diameter further from the first end of the heat storing means, said peripheral wall defining a further opening providing communication between the mixing position and the regenerator chamber, and the burner further comprising a flame stabilizer separate from said inner tubular structure and disposed at the mixing position for causing turbulent flow of the air and the fuel at the mixing position and wherein the flame stabiliser defines an end of the regenerator chamber remote from said first opening.

3. A burner according to claim 2 wherein the smallest diameter portion of said peripheral wall is immediately adjacent to the flame stabilizer and wherein said peripheral wall extends from the flame stabilizer in a direction along the regenerator chamber towards said first opening.

4. A burner according to claim 3 wherein the flame stabilizer is at the free-end of said tubular structure and wherein there is at the center of the flame stabilizer a space which forms a part of the fuel flowpath lying outside said tubular structure.

5. A burner according to claim 2 wherein said heat storing means is in contact with said peripheral wall.

6. A burner according to claim 5 wherein the heat storing means is in contact with said inner tubular structure along substantially the entire length of the heat storing means.

7. A burner according to claim 6 further comprising means for supplying air to the mixing position through said tubular structure.

8. A burner according to claim 6 wherein said inner tubular structure comprises an outer wall and a fuel pipe spaced inwardly from said outer wall by an annular space and wherein said burner further comprises means for supplying air to the mixing position through said annular space between the fuel pipe and the outer wall of the inner tubular structure.

* * * * *